United States Patent Office 2,740,789
Patented Apr. 3, 1956

2,740,789

PRODUCTION OF PYRIDINES

Alexander F. MacLean and Edwin D. Parker, Corpus Christi, Tex., assignors to Celanese Corporation of America, New York, N. Y., a corporation of Delaware No Drawing. Application November 13, 1953,
Serial No. 392,044

6 Claims. (Cl. 260—290)

This invention relates to the production of pyridines and relates more particularly to the production of pyridine from a pentaalkoxypentane.

It is an object of this invention to provide a novel, economical and efficient process for the synthesis of pyridines.

A further object of this invention is the provision of a novel process for the synthesis of pyridine by reacting a pentaalkoxypentane with ammonia in free or combined form.

Other objects of this invention will be apparent from the following detailed description and claims.

According to this invention pyridines are produced by reacting ammonia with a 1,1,3,5,5-pentaalkoxypentane. This reaction may be illustrated by the following equation, showing the reaction of ammonia with 1,1,3,5,5-pentaethoxypentane to produce pyridine:

$$NH_3 + (C_2H_5O)_2CH-CH_2-CH-CH_2-CH(OC_2H_5)_2 \longrightarrow$$
$$\underset{OC_2H_5}{|}$$

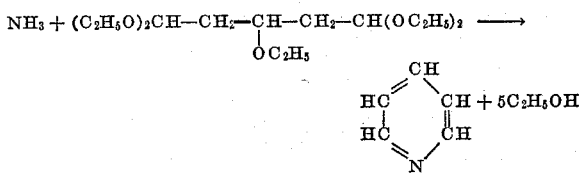

$$+ 5C_2H_5OH$$

The pentaalkoxypentane employed as a reactant in the process of this invention is advantageously one containing lower alkoxy groups, such as methoxy, ethoxy, propoxy, or butoxy groups. All of the alkoxy groups may be the same, as in 1,1,3,5,5-pentaethoxypentane, or the alkoxy groups may be different, as in 1,1,5,5-tetraethoxy-3-methoxy-pentane. The pentaalkoxypentane may be unsubstituted or may carry substituents such as hydrocarbon or substituted hydrocarbon groups, depending on the type of pyridine desired. Thus, if a 3-alkyl pyridine, such as 3-methyl pyridine, is desired, a 2-alkyl-pentaalkoxypentane, such as 1,1,3,5,5-pentaethoxy-2-methylpentane may be employed as the reactant. It is desirable, of course, to employ pentaalkoxypentanes whose substituents, if any, do not materially interfere with the course of the reaction. There should be at least one hydrogen atom directly attached to each of the carbon atoms situated in the 2- and 4-positions of the pentaalkoxypentane.

The ammonia employed as a reactant in the process of this invention may be used in any convenient form, e. g. as anhydrous ammonia in liquid or gaseous form, or as an aqueous solution of ammonia, or as an ammonium salt, such as ammonium chloride or sulfate. It is desirable to supply more than one mole of ammonia, e. g. 2 to 4 moles or more of ammonia, per mole of pentaalkoxypentane and to carry out the reaction of these materials at an elevated temperature, with the temperature depending upon the conditions of reaction, suitable temperatures being, for example, about 80° C. to 285° C. The reaction may be carried out under atmospheric, superatmospheric, or subatmospheric pressure and in the presence or absence of a solvent or dispersing medium, preferably under acidic conditions.

The process of the present invention lends itself readily to either batchwise or continuous operation. Thus, the process may be carried out continuously by injecting a stream of ammonia into a stream of the pentaalkoxypentane, e. g. into a stream of an acidic solution of the pentaalkoxypentane in an aqueous medium, passing the combined streams through a heated reactor, adding an alkaline material to the reacted mixture to liberate the pyridine from its salts, and recovering the liberated pyridine by distillation.

The following examples are given to illustrate the invention further:

*Example I*

107 parts by weight (2 moles) of ammonium chloride are dissolved in 1,000 parts by weight of water and the resulting solution is adjusted to pH 3 by the addition of concentrated sulfuric acid. 146 parts by weight (0.5 mole) of 1,1,3,5,5-pentaethoxypentane are added to this solution and the resulting mixture is heated for one hour, at reflux temperature and at atmospheric pressure, while 101 parts by weight (2.2 moles) of ethanol are removed as a distillate. Thereafter, a stream of anhydrous ammonia is passed, at a rate of about 6 moles per hour, through the resulting residual solution, maintained at a temperature of 80 to 90° C., for one hour, at which time the reaction is essentially complete, as indicated by the fact that the solution absorbs no more ammonia from said stream. After the addition of ammonia is discontinued, 200 parts by weight of methanol and a moderate excess, i. e. 140 parts by weight, of potassium hydroxide are added to the reaction mixture in order to liberate ammonia and pyridine from their salts. The mixture is boiled under reflux to remove the ammonia, following which the methanol and pyridine are recovered by distillation of the mixture.

The yield of pyridine is 54% of the theoretical value.

*Example II*

A solution of 68 parts by weight of ammonia in 870 parts by weight of aqueous ethanol containing 60% ethanol by volume is mixed with 6.6 parts by weight of ammonium sulfate and 292 parts by weight (1 mole) of 1,1,3,5,5-pentaethoxypentane. The resulting liquid mixture is charged into an autoclave, filling 47% of the volume of said autoclave. The autoclave is then closed and the mixture is heated therein to a temperature of 250 to 285° C. for a period of 2 hours, during which time the autogenous pressure in said autoclave attains a value of 1525 pounds per square inch. Thereafter an excess, i. e. 10 parts by weight, of potassium hydroxide is added to the mixture, which is then distilled to recover the pyridine. The yield of pyridine is 51% of the theoretical.

It is to be understood that the foregoing detailed description is given merely by way of illustration and that many variations may be made therein without departing from the spirit of our invention.

Having described our invention, what we desire to secure by Letters Patent is:

1. Process for the production of pyridines, which comprises reacting a 1,1,3,5,5-penta (lower alkoxy) pentane with ammonia at an elevated temperature whereby a pyridine is produced.

2. Process for the production of pyridines, which comprises reacting a 1,1,3,5,5-penta (lower alkoxy) pentane with ammonia at an elevated temperature and recovering the resulting pyridine.

3. Process for the production of pyridines, which comprises reacting a 1,1,3,5,5-penta (lower alkoxy) pentane with ammonia at an elevated temperature under acidic conditions and recovering the resulting pyridine.

4. Process for the production of pyridines, which comprises reacting a 1,1,3,5,5-penta (lower alkoxy) pentane with ammonia at an elevated temperature under acidic conditions in aqueous medium and recovering the resulting pyridine.

5. Process for the production of pyridine, which comprises reacting 1,1,3,5,5-pentaethoxypentane with ammonia at an elevated temperature whereby pyridine is produced.

6. Process for the production of pyridine, which comprises reacting 1,1,3,5,5-pentaethoxypentane at an elevated temperature with an excess of ammonia in an aqueous acidic medium, adding an alkaline material to make said medium alkaline, and recovering pyridine from the resulting mixture by distillation.

References Cited in the file of this patent

Kline: Jour. of the Am. Chem. Soc., vol. 66, pp. 1710–14 (1944).